(12) United States Patent
Schneller et al.

(10) Patent No.: US 8,663,344 B2
(45) Date of Patent: Mar. 4, 2014

(54) ANTIOXIDANT BLENDS SUITABLE FOR USE IN BIODIESELS

(75) Inventors: Emily R. Schneller, Geismar, LA (US); William E. Moehle, Baton Rouge, LA (US); Gangkai Zhao, Shanghai (CN)

(73) Assignee: Albemarle Corporation, Baton Rouge, LA (US)

(*) Notice: Subject to any disclaimer, the term of this patent is extended or adjusted under 35 U.S.C. 154(b) by 507 days.

(21) Appl. No.: 12/675,070

(22) PCT Filed: Jul. 30, 2008

(86) PCT No.: PCT/US2008/071590
§ 371 (c)(1),
(2), (4) Date: Feb. 8, 2011

(87) PCT Pub. No.: WO2009/029373
PCT Pub. Date: Mar. 5, 2009

(65) Prior Publication Data
US 2011/0119989 A1     May 26, 2011

Related U.S. Application Data

(60) Provisional application No. 60/957,754, filed on Aug. 24, 2007.

(51) Int. Cl.
*C10L 1/18* (2006.01)
(52) U.S. Cl.
USPC ............ 44/308; 44/388; 44/412; 44/426; 44/430; 44/431; 44/450

(58) Field of Classification Search
USPC ............ 44/308, 388, 412, 426, 430, 431, 450
See application file for complete search history.

(56) References Cited

U.S. PATENT DOCUMENTS

| 3,556,748 | A | 1/1971 | Stedman | |
|---|---|---|---|---|
| 5,057,123 | A | 10/1991 | Herbstman | |
| 5,525,126 | A * | 6/1996 | Basu et al. | 44/308 |
| 6,083,288 | A | 7/2000 | Wolf | |
| 7,964,002 | B2 * | 6/2011 | DeBlase et al. | 44/412 |
| 2007/0113467 | A1 | 5/2007 | Abou-Nemeh | |
| 2007/0197412 | A1 * | 8/2007 | Carter et al. | 508/510 |
| 2010/0107481 | A1 * | 5/2010 | Gatto et al. | 44/388 |

FOREIGN PATENT DOCUMENTS

| EP | 0 385 633 A1 | 9/1990 |
|---|---|---|
| EP | 0 482 253 A1 | 4/1992 |
| GB | 821384 | 10/1959 |
| GB | 1 477 806 | 6/1977 |
| WO | 2007115844 A1 | 10/2007 |
| WO | 2007145738 A1 | 12/2007 |

* cited by examiner

*Primary Examiner* — Cephia D Toomer
(74) *Attorney, Agent, or Firm* — James A. Jubinsky; Marcy M. Hoefling; Nathan C. Dunn

(57) ABSTRACT

This invention provides stabilized biodiesels comprising (1) biodiesel, such as fatty acid methyl ester (FAME), (2) mono- or bis-hindered phenolic derived from 2,6-di-tert-butylphenol, and (3) N,N-di-substituted para-phenylene diamine. Also methods of stabilizing biodiesel are provided involving adding (2) and (3) to (1).

13 Claims, No Drawings

US 8,663,344 B2

ANTIOXIDANT BLENDS SUITABLE FOR USE IN BIODIESELS

FIELD OF THE INVENTION

The present invention relates stabilized biodiesels comprising (1) biodiesel, such as fatty acid methyl ester (FAME), (2) mono- or bis-hindered phenolic derived from 2,6-di-tert-butylphenol, and (3) N,N'-di-substituted para-phenylene diamine, methods of stabilizing biodiesels, and antioxidant blends suitable for use in biodiesels.

BACKGROUND

As worldwide energy demand continues to increase and reserves of fossil fuels shrink, the diversification of energy sources is increasingly important. Biodiesel is one way to achieve diversification. Biodiesel is a generic name for monoalkyl esters of long-chain fatty acids derived from renewable lipid sources such as vegetable oils, animal fats, or used cooking oils and fats. Biodiesel fuels have many names, depending on the feedstocks used to produce them, and biodiesel feedstocks vary widely in their fatty acid compositions (chain length and saturation). Non-limiting examples of some common feedstocks used in the production of biodiesel include fatty acid methyl ester (FAME), rapeseed methyl ester (RME), used vegetable oil methyl ester (UVOME), soybean oil methyl ester (SOME) or palm oil methyl ester (POME).

Biodiesel is typically produced by the reaction of a vegetable oil or an animal fat with an alcohol, such as methanol, in the presence of a catalyst to yield methyl esters (the biodiesel) and glycerine. The most commonly used catalyst, potassium hydroxide, is used in transesterification of a wide range of oils and fats, from vegetable to animal, from virgin to used, including those with the highest acid contents. The thus produced biodiesel can be distilled to remove excess alcohols and other impurities. Other methods for production of biodiesel are known.

As is known in the art, biodiesel are subject to oxidative degradation. Oxidation of biodiesel by contact with air and metal surfaces results in the formation of hydroperoxides. These induce free-radical chain reactions that lead to decomposition into low-molecular-weight, highly oxidized species (aldehydes, ketones, acids) and high-molecular-weight polymeric materials (gums). These gums tend to cause poor combustion and other engine problems such as deposits on injectors and pistons. The presence of high-molecular weight, insoluble gums generally leads to fuel-filter plugging.

The oxidation stability of biodiesel can be increased by the addition of antioxidants. However, given the relative youth of biodiesel fuels as compared to hydrocarbon fuels, antioxidant technology for biodiesel is not as well-developed.

Thus, there is a need for improved antioxidant compositions for use in biodiesel fuels and for biodiesel compositions comprising such antioxidant compositions that are economically suited for commercial use.

SUMMARY OF THE INVENTION

The inventors hereof have unexpectedly discovered that certain antioxidant blends are effective at improving or increasing the oxidative stability of biodiesels. Thus, in some embodiments, the present invention relates to a composition comprising at least one, sometimes only one, biodiesel and an antioxidant blend wherein the antioxidant blend comprises i) at least one, sometimes only one hindered phenolic compound; ii) at least one, sometimes only one, N,N'-di-substituted para-phenylene diamine; and iii) at least one metal chelator.

In some embodiments, the antioxidant blend comprises i) in the range of from about 10 to about 90 wt. % of at least one, sometimes only one hindered phenolic compound, based on the total weight of the antioxidant blend; ii) in the range of from about 10 to about 90 wt. % at least one, sometimes only one, N,N'-di-substituted para-phenylene diamine, on the same basis; and iii) in the range of from about 0.01 to about 10 wt. % of at least one, sometimes only one, metal chelator.

Generally, the amount of the antioxidant blend used in the compositions of the present invention is in the range of from about 50 ppm to about 5000 ppm, sometimes in the range of from about 100 to about 2500 ppm, both based on the biodiesel.

In other embodiments, the present invention relates to the antioxidant blend.

In still other embodiments, the present invention relates to a method of improving or increasing the oxidative stability of a biodiesel by blending with such biodiesel in the range of from about 50 ppm to about 5000 ppm, sometimes in the range of from about 100 to about 2500 ppm, both based on the biodiesel, of the antioxidant blend described herein.

DETAILED DESCRIPTION OF THE INVENTION

The RANCIMAT test is a widely accepted method for measuring the oxidation stability of biodiesel. This test consists of bubbling air through biodiesel that has been heated to 110° C. The amount of short-chain acids present in the distillate (the cleavage products of the fatty acid oxidation) is a direct indication of the oxidation stability of the biodiesel. Thus, as used herein, RANCIMAT numbers refer to the results of this test. It should be noted that although freshly produced biodiesel may show an oxidation stability (measured by the RANCIMAT method) of more than six hours, this value will decrease over time under common storage conditions if no antioxidants are present.

As used herein, biodiesel can be crude biodiesel, distilled biodiesel, or any individual chemical component of either. Crude biodiesel comprises 8 carbon to 22 carbon saturated, mono-unsaturated, di-unsaturated, or tri-unsaturated methyl ester, or fatty acid methyl ester derived from a vegetable or animal source, and distilled biodiesel comprises crude biodiesel that has been subjected to at least one distillation step, e.g., to remove excess alcohols, residual glycerine, and other impurities, and includes biodiesel obtained as a specific cut or fraction produced during the distillation of crude biodiesel. Also, TTBP as used herein comprises essentially 100% 2,4,6-tri-tert-butylphenol.

Biodiesels

In the practice of the present invention, any biodiesel can be used. The biodiesel can be a crude or distilled biodiesel derived from a plant source, animal fat, algae, or a fresh or used cooking oil. Thus, the biodiesels used in the practice of the present invention can be selected from crude biodiesels or distilled biodiesels such as those crude biodiesels or distilled biodiesels derived from soybean oil, canola oil, palm oil, coconut oil, rapeseed oil, corn oil, or used vegetable oil. In some embodiments, the crude biodiesel can be a fatty acid methyl ester.

Crude biodiesel, as used herein, in some embodiments refers to 8 carbon to 22 carbon saturated, mono-unsaturated, di-unsaturated, or tri-unsaturated methyl ester, or fatty acid methyl ester derived from a vegetable or animal source. Processes for producing crude biodiesel are well know to those skilled in the art. Non-limiting examples of individual chemical components of fatty acid methyl ester include methyl stearate (n-octadecanoic acid, methyl ester), methyl oleate (9-octadecenoic acid, methyl ester), methyl vaccenate (11-octadecenoic acid methyl ester), methyl linoleate (9,12-octadecadienoic acid, methyl ester), or methyl linolenate (9,12,15-octadecatrienoic acid, methyl ester), caprylic acid methyl ester, capric acid methyl ester, lauric acid methyl ester, myristic acid methyl ester, palmitic acid methyl ester, arachidic acid methyl ester, behenic acid methyl ester, lauroleic acid methyl ester, myristoleic acid methyl ester, palmitoleic acid methyl ester, elaidic acid methyl ester, gadoleic acid methyl ester, arachidonic acid methyl ester, erucic acid methyl ester, and the like.

Crude biodiesel can be derived from any suitable vegetable or animal source, including for example soybean oil, low erucic acid rapeseed oil (Canola Oil), high erucic acid rapeseed oil, palm oil, used cooking oil, vegetable oil, coconut oil, corn oil, cottonseed oil, safflower oil, sunflower oil, peanut oil, sugar cane oil, lard, tallow, poultry fat, yellow grease, and the like. Fatty acid methyl ester in crude biodiesel can be produced, e.g., by a transesterification reaction between a vegetable or animal based triglyceride and methanol using a catalyst, as is familiar to those skilled in the art.

Distilled biodiesel refers to crude biodiesel that has been subjected to at least one distillation step, e.g., to remove excess alcohols, residual glycerine, and other impurities, and includes biodiesel obtained as a specific cut or fraction produced during the distillation of crude biodiesel. Methods of distilling crude biodiesel are well known to those skilled in the art.

It should be noted that it is within the scope of the present invention that the crude biodiesel or distilled biodiesel be subjected to additional chemical treatment, e.g., to reduce unsaturation.

Hindered Phenolic Compounds

In the practice of the present invention, the at least one hindered phenolic compound can be selected from any hindered phenolic compound effective as an antioxidant. In some embodiments, the at least one hindered phenolic compound is a mono or bis hindered phenolic. In other embodiments, the at least one hindered phenolic compound is a mono- or bis-hindered phenolic derived from 2,6-di-tert-butylphenol, wherein such hindered phenolic compounds can comprise one or more of ortho-tert-butylphenol, 2,6-di-tert-butylphenol, 2,4,6-tri-tert-butylphenol, 4,4'-methylenebis(2,6-di-tert-butylphenol), 3,5-di-tert-butyl-4-hydroxyphenylhydrocinnamicacid methyl ester, 3,5-di-tert-butyl-4-hydroxyphenylhydrocinnamicacid, C7-C9 branched alkyl esters, 2,6-di-tert-butyl-alpha-dimethylamino-p-cresol; butylated hydroxytoluene, or 2,4,6-tri-tert-butylphenol. In still other embodiments, the hindered phenolic contains 2,6-di-tert-butylphenol; and ortho-tert-butylphenol.

In some embodiments, the at least one mono or bis-hindered phenolics derived from 2,6-di-tert-butylphenols can comprise 2,6-di-tert-butylphenol (e.g., the product comprising 2,6-di-tert-butylphenol sold under the trademark ETHANOX® 4701); 2,4,6-tri-tert-butylphenol; combinations of ortho-tert-butylphenol, 2,6-di-tert-butylphenol, and 2,4,6-tri-tert-butylphenol (e.g., the product comprising ortho-tert-butylphenol, 2,6-di-tert-butylphenol, and 2,4,6-tri-tert-butylphenol sold under the trademark ETHANOX® 4733); combinations of 2,6-di-tert-butylphenol and 2,4,6-tri-tert-butylphenol (e.g., the product comprising 2,6-di-tert-butylphenol and 2,4,6-tri-tert-butylphenol sold under the trademark ETHANOX® 4735); 4,4'-methylenebis(2,6-di-tert-butylphenol) (e.g., the product comprising 4,4'-methylenebis(2,6-di-tert-butylphenol) sold under the trademark ETHANOX® 4702); 3,5-di-tert-butyl-4-hydroxyphenylhydrocinnamicacid, methyl ester (e.g., the product comprising 3,5-di-tert-butyl-4-hydroxyphenylhydrocinnamicacid, methyl ester sold under the trademark ETHANOX® 4750); 3,5-di-tert-butyl-4-hydroxyphenylhydrocinnamicacid, C7-C9 branched alkyl esters (e.g., the product comprising 3,5-di-tert-butyl-4-hydroxyphenylhydrocinnamicacid, C7-C9 branched alkyl esters sold under the trademark ETHANOX® 4716); 2,6-di-tert-butyl-alpha-dimethylamino-p-cresol (e.g., the product comprising 2,6-di-tert-butyl-alpha-dimethylamino-p-cresol sold under the trademark ETHANOX® 4703); butylated hydroxytoluene (BHT); essentially 100% 2,4,6-tri-tert-butylphenol (TTBP), or combinations thereof.

The amount of the at least one hindered phenolic compound used in the practice of the present invention can be in the range of from about 10 to about 90 wt. %, based on the total weight of the antioxidant blend. In some embodiments, the antioxidant blend can comprise in the range of from about 30 to about 70 wt. %, sometimes in the range of from about 45 to about 55 wt. %, of the at least one mono or bis-hindered phenolic, both on the same basis.

N,N'-di-Substituted para-phenylene diamine

The antioxidant blend used in the present invention also comprises at least one N,N'-di-substituted para-phenylene diamine. Non-limiting examples of suitable N,N'-di-substituted para-phenylene diamines are those than comprise N,N'-di-sec-butyl-p-phenylenediamine (PDA), N,N'-diisopropyl-p-phenylenediamine, N,N'-bis-(1,4-dimethylpentyl)-p-phenylenediamine, or combinations thereof. Non-limiting examples of commercially available N,N'-di-substituted para-phenylene diamines include those sold under the ETHANOX®, such as, for example, ETHANOX® 4720.

The amount of the at least one N,N'-di-substituted para-phenylene diamine used in the practice of the present invention can be in the range of from about 10 to about 90 wt. %, based on the total weight of the antioxidant blend. In some embodiments, the antioxidant blend can comprise in the range of from about 30 to about 70 wt. %, sometimes in the range of from about 45 to about 55 wt. %, of the at least one N,N'-di-substituted para-phenylene diamine, both on the same basis.

Metal Chelator

The antioxidant blend used in the practice of the present invention also comprises at least one metal chelator, and the metal chelator used in the present invention can be selected from any known.

The amount of the at least one metal chelator used in the practice of the present invention can be in the range of from about 0.01 to about 10 wt. %, based on the total weight of the antioxidant blend. In some embodiments, the antioxidant blend can comprise in the range of from about 0.01 to about 5 wt. %, sometimes in the range of from about 0.1 to about 5 wt. %, of the at least one metal chelator, both on the same basis.

Non-limiting examples of suitable metal chelators include those of the crown ether type, cryptand, acidic, and amine type. In some embodiments, the metal chelator can be an N,N'-disalicylidene-1,2-alkyldiamine such as for example, N,N'-disalicylidene-1,2-propanediamine, N,N'-disalicylidene-1,2-ethanediamine, N,N'-disalicylidene-1,2-butanediamine, or N,N-disalicylidene-1,2-pentanediamine. A non-limiting example of a commercially available N,N- disalicylidene-1,2-alkyldiamine is Ethanox® 4705 which is a mixture of N,N'-disalicylidene-1,2-propanediamine and xylenes.

Non-limiting examples of crown ether type metal chelators include 18-crown-6 and C-substituted derivatives of 18-crown-6; 1,10-diaza-18-crown-6 and N- and/or C-substituted derivatives of 1,10-diaza-18-crown-6; 1-aza-18-crown-6 and N- and/or C-substituted derivatives of 1-aza-18-crown-6; 15-crown-5 and C-substituted derivatives of 15-crown-5; 1,7-diaza-15-crown-5 and N- and/or C-substituted derivatives of 1,7-diaza-15-crown-5; 1-aza-15-crown-5 and N- and/or C-substituted derivatives of 1-aza-15-crown-5; 12-crown-4 and C-substituted derivatives of 12-crown-4; 1,7-diaza-12-crown-4 and N- and/or C-substituted derivatives of 1,7-diaza-12-crown-4; 1-aza-12-crown-4 and N- and/or C-substituted derivatives of 1-aza-12-crown-4; Dibenzo-18-crown-6 and C-substituted derivatives of Dibenzo-18-crown-6; Dibenzo-21-crown-7 and C-substituted derivatives of Dibenzo-21-crown-7; Dibenzo-24-crown-8 and C-substituted derivatives of Dibenzo-24-crown-8; and Dibenzo-30-crown-10 and C-substituted derivatives of Dibenzo-30-crown-10.

Non-limiting examples of cryptand type metal chelators include 4,7,13,18-tetraoxa-1,10-diazabicyclo[8.5.5]eicosane and C-substituted derivatives of 4,7,13,18-tetraoxa-1,10-diazabicyclo[8.5.5]eicosane; 4,7,13,16,21-pentaoxa-1,10-diazabicyclo[8.8.5]tricosane and C-substituted derivatives of 4,7,13,16,21-pentaoxa-1,10-diazabicyclo[8.8.5]tricosane; 4,7,13,16,21,24-hexaoxa-1,10-diazabicyclo[8.8.8]hexacosane and C-substituted derivatives of 4,7,13,16,21,24-hexaoxa-1,10-diazabicyclo[8.8.8]hexacosane. For a more complete review of macrocycle metal chelators (crown ethers and cryptand type metal chelators), please see Izatt, R. M.; Pawlak, K.; Bradshaw, J. S.; Chem. Rew., 1991, Vol. 91, p 1721-2085.

Non-limiting examples of acidic and amine type metal chelators include glutaric acid; Citric Acid; Ethylenediamine-N,N'-diacetic acid; Ethylenediaminetetraacetic acid (EDTA); N,N-di-substituted-Ethylenediamines; N-substituted-ethylenediamines; N,N'-disubstituted-1,3-propylenediamines; N-substituted-1,3-propylenediamines; N,N'-disubstituted-1,2-propylenediamines; and N-substituted-1,2-propylenediamines.

Combinations

Compositions according to this invention comprising, or prepared by combining, the at least one biodiesel, the at least one hindered phenolic, the at least one N,N'-di-substituted para-phenylene diamine, and the metal chelator.

Methods of improving oxidation stability of biodiesel according to this invention can comprise combining the biodiesel and from about 50 ppm to about 5000 ppm of the antioxidant blend. Such methods can also comprising combining the biodiesel component and from about 100 ppm to about 2500 ppm of the antioxidant blend.

The above description is directed to several embodiments of the present invention. Those skilled in the art will recognize that other means, which are equally effective, could be devised for carrying out the spirit of this invention. It should also be noted that preferred embodiments of the present invention contemplate that all ranges discussed herein include ranges from any lower amount to any higher amount. The following examples will illustrate the present invention, but are not meant to be limiting in any manner.

EXAMPLES

Example 1

The following set of experiments was used to determine optimal amount of the metal chelator in a representative sample of yellow grease or used cooking oil. In these experiments, the yellow grease was combined with 300 ppm, based on the yellow grease, of an antioxidant blend containing no antioxidant; 80% of a mixture containing Ethanox® 4720 and Ethanox® 4733 in a 1:1 ratio, and 20% Ethanox® 4705 as a metal chelator (referred to as Antioxidant 2 in Table 1); 90% a mixture containing Ethanox® 4720 and Ethanox® 4733 in a 1:1 ratio, and 10% Ethanox® 4705 as a metal chelator (referred to as Antioxidant 3 in Table 1); or 98% a mixture containing Ethanox® 4720 and Ethanox® 4733 in a 1:1 ratio, and 2% Ethanox® 4705 as a metal chelator (referred to as Antioxidant 4 in Table 1). The combination of the yellow grease and antioxidant was subjected to the RANCIMAT test, as described above, and the results are depicted in Table 1, below. The results showed good benefits in all systems, but the system with 2% of a metal chelator unexpectedly showed the best performance.

TABLE 1

| Antioxidant | RANCIMAT (hours) |
|---|---|
| No antioxidant | 4.95 |
| 300 ppm Antioxidant 2 | 8.05 |
| 300 ppm Antioxidant 3 | 8.52 |
| 300 ppm Antioxidant 4 | 9.52 |

Example 2

In this example, the same Antioxidants and testing was performed as described in Example 1 except soybean biodiesel was used instead of yellow grease. Also, Antioxidant 1) was used, which is the mixture containing Ethanox® 4720 and Ethanox® 4733 in a 1:1 ratio. We see the same trend as before. The results are reported in Table 2, below. As can be seen in Table 2, the results showed good benefits in all systems, but the system with 2% of a metal chelator unexpectedly showed the best performance.

TABLE 2

| Antioxidant | RANCIMAT (hours) |
|---|---|
| No antioxidant | 1.28 |
| 300 ppm Antioxidant 1 | 9.38 |
| 300 ppm Antioxidant 2 | 10.24 |
| 300 ppm Antioxidant 3 | 10.92 |
| 300 ppm Antioxidant 4 | 11.44 |

What is claimed:

1. A composition derived from at least one biodiesel and,
   i) at least one hindered phenolic compound;
   ii) at least one N,N'-di-substituted para-phenylene diamine; and
   iii) at least one metal chelator, wherein the combined amount of i)-iii) is in the range of from about 50 ppm to about 5000 ppm based on the biodiesel;
   wherein i) is present in an amount in the range of from about 10 to about 90 wt. %, based on the total weight of i)-iii); ii) is present in an amount in the range of from about 10 to about 90 wt. %, based on the total weight of i)-iii); and iii) is present in an amount in the range of from about 0.01 to about 10 wt. %, based on the total weight of i)-iii).

2. The composition according to claim 1 wherein the at least one biodiesel is a crude or distilled biodiesel.

3. The composition according to claim 2 wherein said crude or distilled biodiesel is derived from a plant source, animal fat, algae, or fresh or used cooking oil.

4. The composition according to claim 2 wherein said crude or distilled biodiesel is a fatty acid methyl ester.

5. The composition according to claim 1 wherein the at least one hindered phenolic is a mono- or bis-hindered phenolic derived from 2,6-di-tert-butylphenol.

6. The composition according to claim 1 wherein the at least one metal chelator is a crown ether type, cryptand type, acidic type, and amine type.

7. The composition according to claim 1 wherein
  i) the at least one biodiesel consists essentially of a) at least one crude biodiesel, b) at least one distilled biodiesel, or combinations of a) and b);
  ii) the at least one hindered phenolic compound is
    (a) ortho-tert-butylphenol,
    (b) 2,6-di-tert-butylphenol,
    (c) 2,4,6-tri-tert-butylphenol,
    (d) 4,4'-methylenebis(2,6-di-tert-butylphenol),
    (e) 3,5-di-tert-butyl-4-hydroxyphenylhydrocinnamicacid, methyl ester,
    (f) 3,5-di-tert-butyl-4-hydroxyphenylhydrocinnamicacid, C7-C9 branched alkyl esters,
    (g) 2,6-di-tert-butyl-alpha-dimethylamino-p-cresol, or
    (h) butylated hydroxytoluene;
  iii) the at least one N,N'-di-substituted para-phenylene diamine comprises:
    (a) N,N'-di-sec-butyl-p-phenylenediamine,
    (b) N,N'-diisopropyl-p-phenylenediamine, or
    (c) N,N'-bis-(1,4-dimethylpentyl)-p-phenylenediamine; and
  iv) the at least one metal chelator is at least one N,N'-disalicylidene-1,2-alkyldiamine, wherein ii) is present in an amount in the range of from about 10 to about 90 wt. %, based on the total weight of ii)-iv); iii) is present in an amount in the range of from about 10 to about 90 wt. %, based on the total weight of ii)-iv); and iv) is present in an amount in the range of from about 0.01 to about 10 wt. %, based on the total weight of ii)-iv).

8. A composition comprising
  i) at least one a) crude biodiesel, b) distilled biodiesel, or combinations of a) and b);
  ii) at least one hindered phenolic compound;
  iii) at least one N,N'-di-substituted para-phenylene diamine; and
  iv) at least one metal chelator,
wherein the combined amount of ii)-iv) is in the range of from about 50 ppm to about 5000 ppm based on the biodiesel.

9. The composition according to claim 8 wherein
  i) said at least one biodiesel is a) at least one crude biodiesel, b) at least one distilled biodiesel, or combination of a) and b);
  ii) the at least one hindered phenolic compound is:
    (a) ortho-tert-butylphenol,
    (b) 2,6-di-tert-butylphenol,
    (c) 2,4,6-tri-tert-butylphenol,
    (d) 4,4'-methylenebis(2,6-di-tert-butylphenol),
    (e) 3,5-di-tert-butyl-4-hydroxyphenylhydrocinnamicacid, methyl ester,
    (f) 3,5-di-tert-butyl-4-hydroxyphenylhydrocinnamicacid, C7-C9 branched alkyl esters,
    (g) 2,6-di-tert-butyl-alpha-dimethylamino-p-cresol, or
    (h) butylated hydroxytoluene;
  iii) the at least one N,N'-di-substituted para-phenylene diamine comprises:
    (a) N,N'-di-sec-butyl-p-phenylenediamine,
    (b) N,N'-diisopropyl-p-phenylenediamine, or
    (c) N,N'-bis-(1,4-dimethylpentyl)-p-phenylenediamine; and
  iv) the at least one metal chelator is at least one N,N'-disalicylidene-1,2-alkyldiamine, wherein ii) is present in an amount in the range of from about 10 to about 90 wt. %, based on the total weight of ii)-iv); iii) is present in an amount in the range of from about 10 to about 90 wt. %, based on the total weight of ii)-iv); and iv) is present in an amount in the range of from about 0.01 to about 10 wt. %, based on the total weight of ii)-iv).

10. The composition according to claim 9 wherein the metal chelator is at least one of N,N'-disalicylidene-1,2-propanediamine, N,N'-disalicylidene-1,2-ethanediamine, N,N'-disalicylidene-1,2-butanediamine, or N,N'-disalicylidene-1,2-pentanediamine.

11. A method of improving the oxidative stability of a biodiesel comprising combining with said biodiesel:
  i) at least one hindered phenolic compound;
  ii) at least one N,N'-di-substitute para-phenylene diamine; and
  iii) at least one metal chelator,
wherein the combined amount of i)-iii) is in the range of from about 50 ppm to about 5000 ppm based on the biodiesel, and wherein i) is present in an amount in the range of from about 10 to about 90 wt. %, based on the total weight of i)-iii); ii) is present in an amount in the range of from about 10 to about 90 wt. %, based on the total weight of i)-iii); and iii) is present in an amount in the range of from about 0.01 to about 10 wt. %, based on the total weight of i)-iii).

12. The composition of claim 1, wherein the metal chelator is present in an amount in the range of from about 0.01 to about 5 wt. %, based on the total weight of i)-iii).

13. The composition of claim 1, wherein the metal chelator is present in an amount in the range of from about 0.01 to about 2 wt. %, based on the total weight of i)-iii).

* * * * *

UNITED STATES PATENT AND TRADEMARK OFFICE
CERTIFICATE OF CORRECTION

PATENT NO. : 8,663,344 B2
APPLICATION NO. : 12/675070
DATED : March 4, 2014
INVENTOR(S) : Schneller et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 956 days.

Signed and Sealed this

Twenty-ninth Day of September, 2015

Michelle K. Lee
*Director of the United States Patent and Trademark Office*